United States Patent [19]
Stamegna

[11] Patent Number: 6,058,298
[45] Date of Patent: *May 2, 2000

[54] VEHICULAR AUDIO SYSTEM INCORPORATING DETACHABLE CELLULAR TELEPHONE

[76] Inventor: Ivano Stamegna, 18971 Glenmont, Irvine, Calif. 92715

[ * ] Notice: This patent is subject to a terminal disclaimer.

[21] Appl. No.: 09/283,486

[22] Filed: Apr. 1, 1999

Related U.S. Application Data

[63] Continuation of application No. 09/129,148, Aug. 5, 1998, which is a continuation of application No. 08/550,799, Oct. 30, 1995, Pat. No. 5,797,088.

[51] Int. Cl.$^7$ ...................................................... H04B 1/06

[52] U.S. Cl. .............................................. 455/345; 455/90

[58] Field of Search ................... 455/66, 90, 95, 455/99, 344, 345, 346, 347, 348, 349, 350, 351, 127, 556, 557, 575

[56] References Cited

U.S. PATENT DOCUMENTS

| | | |
|---|---|---|
| 4,875,229 | 10/1989 | Palett et al. . |
| 4,896,370 | 1/1990 | Kasparian et al. .......................... 455/77 |
| 5,202,913 | 4/1993 | Lang et al. . |
| 5,261,121 | 11/1993 | Hashimoto . |
| 5,418,836 | 5/1995 | Yazaki . |
| 5,537,673 | 7/1996 | Nagashima et al. ..................... 455/346 |
| 5,797,088 | 8/1998 | Stamegna ................................ 455/345 |

*Primary Examiner*—Nguyen Vo
*Assistant Examiner*—Marsha D. Banks-Harold
*Attorney, Agent, or Firm*—Drummond & Duckworth

[57] ABSTRACT

The present invention is a vehicular audio/cellular telephone system including a vehicular audio system and cellular telephone. In a first embodiment, the vehicular audio system including an AM/FM radio, cassette player, CD player, or combinations of these, integrates a detachable cellular telephone including a transceiver, rechargeable battery, and small non-directional antenna. A recorder means, typically in the form of the cassette player, is provided to record communications over the cellular telephone. When integrated into the vehicular audio system, the cellular telephone uses the vehicle's power source and external antenna.

5 Claims, 2 Drawing Sheets

VEHICULAR AUDIO SYSTEM INCORPORATING DETACHABLE CELLULAR TELEPHONE

This application is a continuation application of USA Application Ser. No. 09/129,148, filed Aug. 5, 1998, which is, in-turn, a continuation application of USA Application Ser. No. 08/550,799, filed Oct. 30, 1995, now U.S. Pat. No. 5,797,088.

BACKGROUND OF THE INVENTION

The present invention relates to cellular telephone systems. Further, the invention relates to vehicular audio systems. Even more particularly, the present invention relates to a vehicular audio system that integrates a cellular telephone.

Mobile cellular telephones have become ubiquitous in present day society. Generally, these mobile cellular telephones can be held in the hand and include a key pad with ten numerical keys and one or more function keys for initiating transmission and receipt of incoming and outgoing telephone calls. When making a cellular telephone call, it is necessary to enter the desired telephone number or press a key sequence to recall the desired telephone number from a memory directory, and press a "send" key. In the interest of weight and convenience, the size of cellular telephones have been reduced during the last few years. For example, the cellular telephone manufactured by Sony under the identification number CM-RX100, measures 3½"×2⅜"×1⅛" and weighs only a few ounces. Due to their small size, low weight and recent use of satellite relay stations, cellular telephones can be used virtually anywhere in the world.

Increasing numbers of automotive vehicles are being equipped with mobile communication devices such as cellular telephones. These have expanded from the original radios installed in police, fire department and taxi vehicles to a large percentage of all vehicles on the road today. These systems are, generally, not encompassed entirely in the user's hand but incorporate the power system of the vehicle and include an antenna mounted to the exterior of the vehicle. Though these system are mobile, due to their dependence on the power and antenna systems of the vehicle, they are confined to the mobility of the vehicle and cannot be removed from the vehicle.

In order to take advantage of the benefits of both the pedestrian hand-held cellular telephone and the vehicular cellular telephone, new systems have been developed which permit the hand-held pedestrian model to be detachably mounted into a vehicle. These mounting apparatus typically include engagement and releasing devices and electrically conductive terminals for communicating power and radio signals or the like between the vehicle and the cellular mobile telephone. For example, U.S. Pat. No. 4,698,838 and U.S. Pat. No. 4,852,147 disclose mobile cellular telephones incorporated into a vehicle's steering wheel assembly. Each reference discloses that the cellular telephone may be removed for pedestrian use. Additionally, U.S. Pat. No. 4,646,343 and U.S. Pat. No. 4,868,862 disclose cellular telephones detachably mounted to the dashboard of a vehicle.

None of the above referenced cellular telephone systems take advantage of the audio and control systems already found in an automotive vehicle. Nearly every vehicle is equipped with an audio system, such as a radio, cassette player, CD player, and combinations thereof. These audio systems include a number of elements found in a cellular telephone such as a power system, volume control, and a set of one or more speakers which generally, due to less size constraints, are of higher quality than found in a cellular telephone. Thus, it would be desirable to integrate a cellular telephone to a vehicular audio system in order to share components and to thereby eliminate duplication and reduce costs and complexity of the overall system. To this end, U.S. Pat. No. 5,243,640 discloses a cellular telephone that has been physically integrated into the vehicular audio system.

This reference does not disclose a cellular telephone and vehicular audio system where the cellular telephone is detachable from the audio system and removable from the vehicle. Accordingly, it would be advantageous to have an improved cellular telephone and vehicular audio system that incorporates a hand-held cellular telephone that is detachably mounted in the interior of a vehicle.

Further, it would be advantageous to have a cellular telephone and vehicular audio system that integrates a cellular telephone with a vehicular audio system to share components, to eliminate duplication, to reduce costs and diminish the complexity of the overall system.

SUMMARY OF THE INVENTION

The present invention addresses the aforementioned disadvantages by providing a vehicular audio/cellular telephone system including an audio system and a cellular telephone. More particularly, the improvement is a vehicular audio/cellular telephone system where the cellular telephone is detachably mounted to the vehicle's audio system. In this manner, the cellular telephone of the present invention is capable of being conveniently and efficiently utilized by a user both in a vehicle and at locations distant from that vehicle.

As discussed above, mobile cellular telephones are typically provided in two forms. The first mobile telephone system comprises a cellular telephone that is hard-mounted (affixed) into a vehicle such as an automobile or truck. These systems typically include an antenna non-detachably mounted to the exterior of the vehicle coupled to a transceiver disposed in the vehicle's interior. Power for the transceiver is generally supplied through the vehicle's power system. The second presently employed mobile telephone system is a portable hand-held transceiver. These systems typically weigh a few pounds or less and include a small rechargeable battery.

It is recognized that the vast majority of all vehicles include some sort of audio system. These are usually in the form of an AM/FM radio but often include additional features such as cassette or CD player. Importantly, vehicular audio systems also include a power supply, an antenna for receiving radio signals and a speaker system having volume control. Each of these features are also found on mobile cellular telephone systems. Because the audio system found in a vehicle do not have the weight, power or dimensional limitations that constrain the designs of cellular telephones, the receiver and audio portions of the audio systems often offer better quality, efficiency and control than their cellular telephone counterparts.

The present invention provides for an vehicular audio/cellular telephone system that takes advantages of the beneficial features of a cellular telephone system that is hard-mounted into a vehicle, with the convenience of a hand-held portable cellular telephone and the quality, efficiency and control of the audio system found in most vehicles. For example, detached from the vehicular audio system, the cellular telephone of the present invention, utilizes its own antenna. This antenna is typically very small and often retractable for facilitating pedestrian use. When integrated to the vehicular audio system, the cellular telephone of the present invention takes advantage of the antenna used by the vehicular audio system ordinarily used only to receive AM and FM signal transmissions. In this manner, in operation, the cellular telephone takes advantage of the antenna affixed to the exterior of the vehicle. The technology for receiving multiple signals at different frequencies is reflected in U.S. Pat. Nos. 5,134,419, 5,280,636 & 5,300,936 and will not be discussed in further detail.

The present invention incorporates the inherent advantages of both the vehicular audio system and the mobile pedestrian cellular telephone by permitting each system to independently control the other. For example, the present system inhibits or reduces the sound emanating from the audio system when an incoming call is received or is in progress. In particular, the invention includes a means of controlling the volume of both systems independently. In another embodiment, the present invention includes a means of controlling the volume of the vehicular audio system as a ratio of the volume of the sound produced by the cellular telephone. In this manner, the audio of the cellular telephone can be set so as to always be understood by the listener over the volume of the vehicular audio system.

Similarly, when detached from vehicular audio system, the cellular telephone of the present invention will use its own integrated microphone and speaker. When attached to the vehicular audio system, the cellular telephone will produce audio through the speaker system of the vehicular audio system. In this manner, the miniature speaker of the cellular telephone is replaced with the higher quality, larger, multiple speaker system typically found in vehicular audio systems. Furthermore, in a first embodiment, the vehicular audio system of the present invention does not include an additional microphone for use when the cellular telephone is integrated to the vehicular audio system. In the interests of cost and simplicity, the speaker found in the cellular telephone is configured to receive and transmit a driver or occupant's voice even when integrated to a vehicular audio system. In an additional embodiment, the vehicular audio system includes an additional microphone which, by example only, may be disposed in the driver side visor or steering wheel of vehicle. In this manner, the quality of transmission from the cellular telephone may be increased by utilizing a higher quality microphone, by utilizing a directional microphone to be directed to the speaker's mouth, or by utilizing a microphone in closer proximity to the speaker's mouth.

In still another embodiment, telephone status information is displayed on the display disposed in the vehicular audio system. Typically, vehicular audio systems include a LCD display that discloses the present function of the audio system. For example, an audio display will typically disclose present volume, the playing mode such as AM, FM, tape player or compact disc, received radio frequency (rf) or if the audio system is playing a tape or compact disc, the musical tract. The present invention takes advantage of the fact that vehicular audio displays are engineered to efficiently transmit information to the driver. Accordingly, the present invention displays the cellular telephone status information, such as number dialed, telephone volume, and whether a call is initiated, on the vehicular audio display.

An advantage of the present invention is that a person is not required to purchase a separate cellular telephone for both their vehicle and for pedestrian use to enjoy the advantageous features found in each apparatus.

Furthermore, the present invention provides for an optimal location for a cellular telephone in a vehicle to maximize user ergonomics while simultaneously charging the cellular telephone for pedestrian use.

Other features and advantages of the present invention will be appreciated by those skilled in the art upon reading the detailed description which follows with reference to the attached drawings.

BRIEF DESCRIPTION OF THE DRAWINGS

These and other features, aspects, and advantages of the present invention will become better understood with regard to the following description, appended claims, and accompanying drawing where:

DETAILED DESCRIPTION OF THE INVENTION

Figure 1:
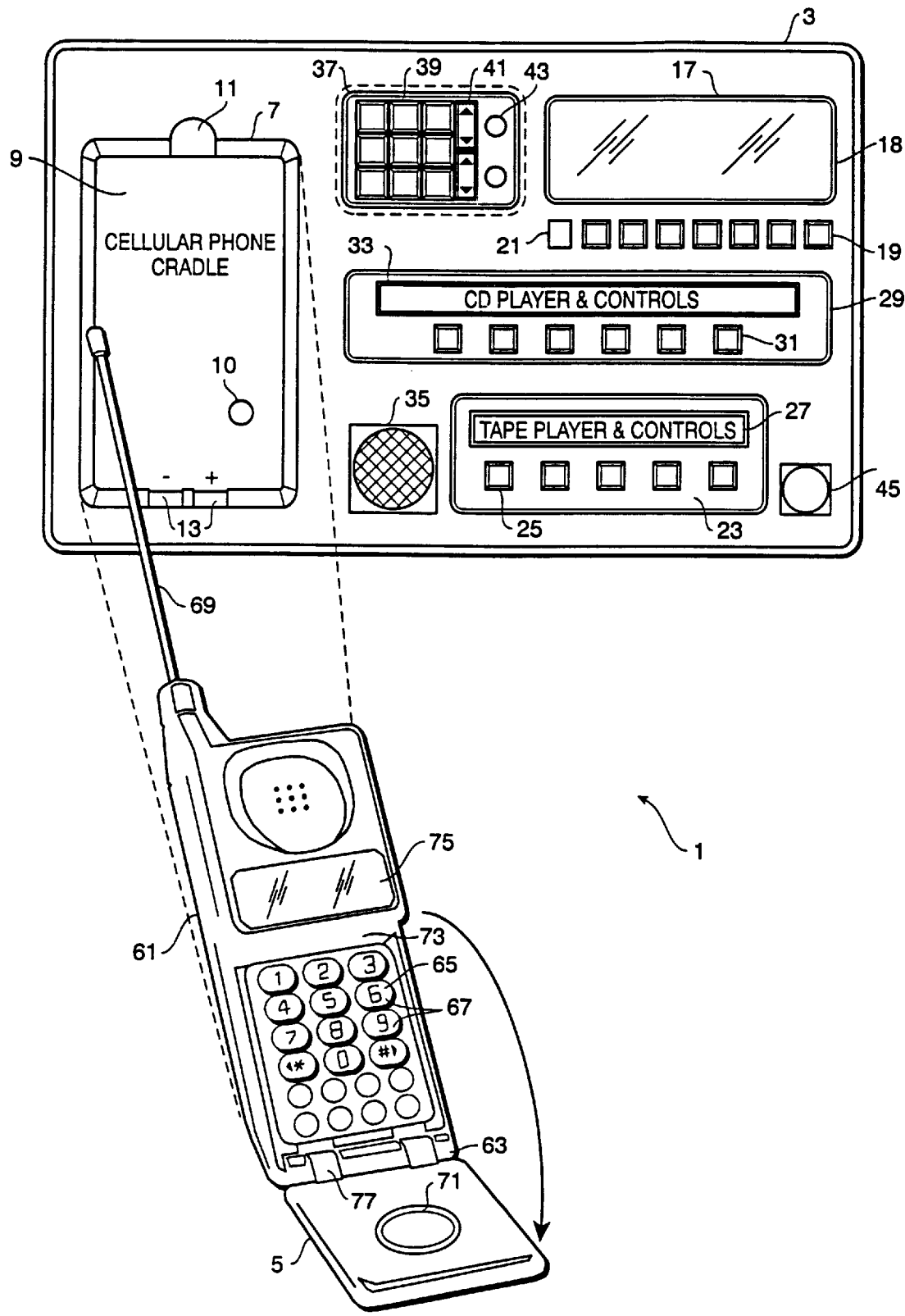
FIG. 1 is a frontal view of the vehicular audio/cellular telephone system of the present invention.

While the present invention is susceptible of embodiment in various forms, there is shown in the drawings and will hereinafter be described a presently preferred embodiment of the invention, with the understanding that the present disclosure is to be considered as an exemplification of the invention and is not intended to limit the invention to the specific embodiment illustrated.

As shown in the exemplary drawings where like numerals represent like elements, the invention is embodied in a vehicular audio system incorporating a detachable cellular telephone. Referring to FIG. 1, the vehicular audio system incorporating detachable cellular telephone 1, includes a vehicular audio system 3 and cellular telephone 5. The audio system 3 includes an AM/FM radio 18, a cassette player 23, a CD player 29, or a combination of these. As is understood by those in the art, the cassette player and CD player of the present invention includes cassette and CD controls 25 and 31, respectively. Further, first and second cavities 27 and 33 are disposed in the vehicular audio system to receive audio cassettes and audio CDs. As shown in FIG. 1, the audio system further includes an AM/FM control button 21 and radio presets 19.

In addition, the vehicular audio system includes a cellular phone cradle configured as a rectangular recession for receipt of the detachable cellular telephone 5. In turn, the cellular telephone cradle includes a release button 11, a push-off spring 15, and power and signal terminals 13. The cellular telephone cradle 7 permits receipt and affixation of a cellular telephone such that audio system terminals 13 engage electrical terminals 77 disposed on the exterior of the cellular telephone. Operation of the release button 11 in conjunction with push off spring 15 disengages and ejects the cellular telephone 5 from the vehicular audio system 3 to permit mobile use of the cellular telephone independent of the vehicular audio system.

In a preferred embodiment of the present invention, the vehicular audio system includes numerous power and signal terminals 13, though only two are shown for clarity. For example, in a preferred embodiment the cellular telephone and audio system include terminals for communicating power, electrical ground, relay of received antenna signals, external microphone signals, outgoing voice signals and control signals. The function and operation of each of the terminals are discussed in greater detail below.

A control panel 37 is disposed in the face of the vehicular audio system 3 to provide primary control of both the vehicular audio system and the cellular telephone. In a preferred embodiment, the control panel 37 includes a numerical key pad 39, intensity control 41 and mode control buttons 43.

The vehicular audio system also includes a display 17 that discloses the present function of the audio system or cellular telephone. In conjunction with the operation of control panel 37, the display 17 discloses the operating mode and functions of the audio system such as AM, FM, tape player, CD player, volume, etc., as well as cellular telephone status information such as the number dialed, telephone volume, initiation of call being sent, etc.

As would be understood by those in the art, the detachable cellular telephone 5 may be provided in any number of configurations. As shown in FIG. 1, an embodiment of the cellular telephone is configured as a flip phone including a swivel 63 whereby microphone 71 may be rotated about swivel 63 to engage the face plate of the main body of the cellular telephone or rotated in the opposite direction to provide access to a numerical key pad 65 and a display 75. The cellular telephone comprises a small, lightweight, low cost, mobile transceiver hand-set with a small, non-directional antenna 69. The single antenna 69 provides both transmit and receive functions. It is fully portable and whether stationary or in motion, permits access to a wide range of communications services such as voice communication, facsimile, or computer network accessibility. Typically, the cellular telephone includes a liquid crystal display 75 for displaying communication status such as the telephone number to be transmitted, battery power level, received signal strength level and the like. The cellular telephone further includes a transceiver circuit (not shown) connected to a speaker 73 which is driven by an audio amplifier. The transceiver circuit also includes a receiver which is coupled to an antenna 69. The receiver receives incoming radio frequency telephone signals from a cellular transponding unit. Transceiver further includes a transmitter coupled to a microphone 71. When separated from the vehicular audio system 3, the cellular telephone 5 operates in a conventional manner. Rechargeable battery power is applied to the transceiver circuit. The operation of the numerical keypad coupled to the transceiver circuit initiates telephone communication. The transmitter connected to microphone 71 sends rf telephone speech signals to the cellular transponder unit by means of antenna 69. Similarly, the receiver receives rf telephone speech signals from antenna 71 which are processed and relayed to speaker 73.

In the engaged configuration, in which cellular telephone 5 is disposed in the audio system recess 9, the cellular telephone terminals 77 engage the vehicular audio system terminals 13. In this manner, power is relayed from the vehicular audio system power source (not shown) to the rechargeable battery disposed in the cellular telephone 5. Similarly, various signals are transmitted to the cellular telephone from the vehicular audio system. Rf voice cellular communication signals received from the vehicular audio system's antenna mounted on the exterior of the vehicle and voice signals produced from external microphone 35 are relayed through the terminals 77 and 13 to cellular telephone's transceiver. Control signals produced from control panel 37 to control the operation of the cellular phone, such as the inputting of phone numbers to place a call, are also communicated through terminals 77 and 13 to the cellular telephone.

It is an object of the invention that when the cellular telephone is integrated to the vehicular audio system that a single control panel 37 controls the functions of both systems when integrated. Accordingly, the control panel includes a numerical key pad 39 to allow the user to input numerals for placing a call. Mode control buttons 43 permits selection of the audio or cellular telephone mode, such as a choice between radio, tape player, CD player, cellular communication, or a combination of these. In a preferred embodiment, intensity controls 41 control the audio produced from both the received rf communications signal and the radio signal independently. More particularly, the audio portion produced from the cellular telephone may be controlled as a ratio of the intensity of the audio produced from the received radio signal. For example, the audio of the cellular telephone may be set at twice the intensity of the audio of the radio permitting the user to communicate on the cellular telephone while still listening to the vehicular audio system at a comfortable volume. Increasing or decreasing the volume of combined audio can be effected by manipulating a single intensity control 41 while maintaining the volume of the audio of the cellular telephone at the same ratio to the volume of the audio of the vehicular audio system. Likewise, the ratio of the volume of the cellular telephone system to the volume of the vehicular audio system can be effected by manipulating a single intensity control to permit the user to increase or decrease the volume of either system while maintaining a relatively constant combined volume in the vehicle.

It is another object of the invention that the vehicular audio system 3 include an additional microphone 35 separate from the microphone 71 disposed in the cellular telephone 5. As shown in FIG. 1, the microphone is disposed in the faceplate of the vehicular audio system 3; however, the invention includes additional configurations where the microphone is situated closer to the user's mouth such as being placed in the vehicle's steering wheel or sunvisor. Voice communication from the user is received by microphone 35 and relayed as an electrical signal to the transceiver circuit in the cellular telephone through terminals 13 and 77. The transceiver circuit processes the received voice communication into an outgoing radio frequency in either analog or digital form. The radio signal is thereafter fed through terminals 77 and 13 to the antenna disposed on the vehicle's exterior which transmits the signal to a cellular receiving station.

In another preferred embodiment, the vehicular audio tape player is electrically coupled to the cellular telephone and includes capabilities of recording incoming and outgoing voice communication from the cellular telephone. All voice communication through the cellular telephone can be recorded for further review.

Figure 2:
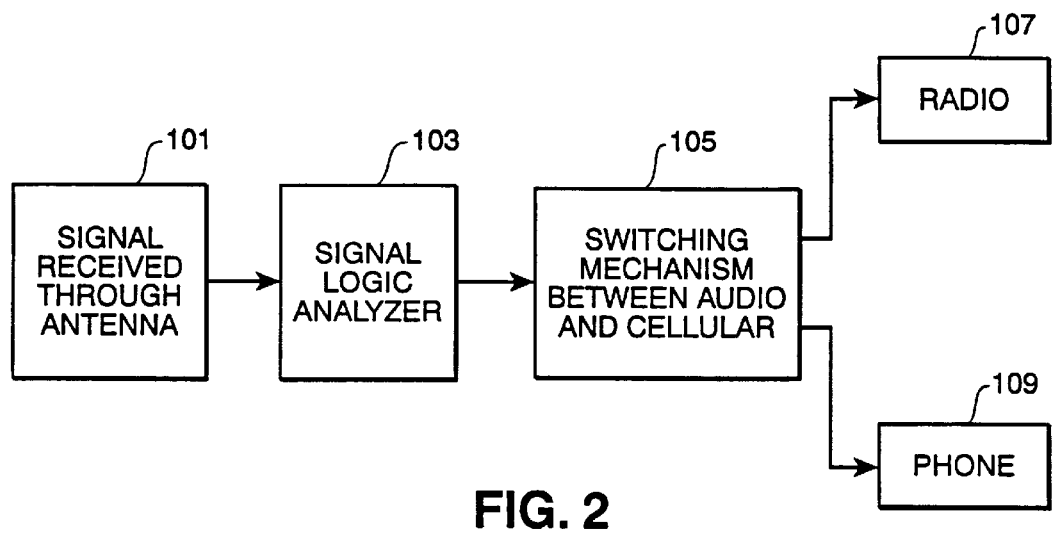
FIG. 2 is a block diagram of the operation of the present invention describing the receipt and separation of respective rf AM/FM radio signals and rf cellular telephone communication signals.

Referring to FIG. 2, there is shown a block diagram describing the function of the vehicular audio system receiver. The antenna receives both rf AM/FM radio signals and rf communication signals through the vehicle's exterior antenna 101. A signal analyzer determines whether the received signals are rf communication signals or radio signals which are then separated by signal splitters and bandpass filters or the like in the switching mechanism 105. Once separated, the respective signals are sent to the AM/FM radio circuitry 107 and to the cellular telephone circuitry 109.

Figure 3:
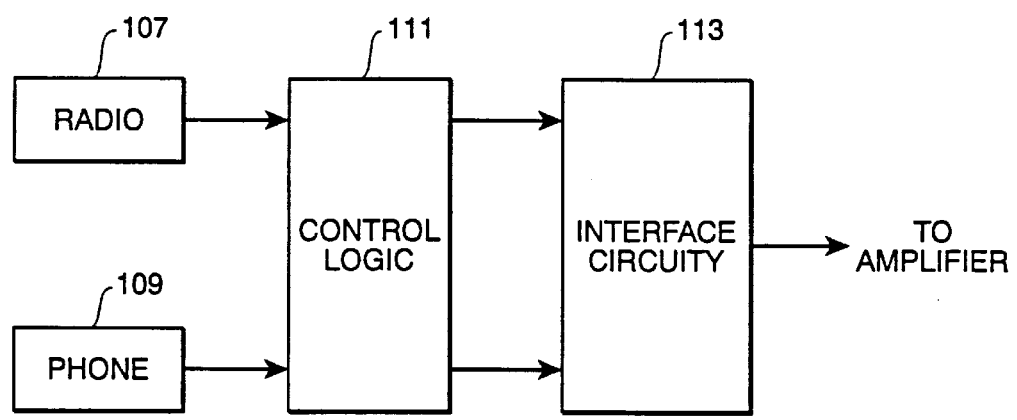
FIG. 3 is a block diagram of the operation of the present invention describing the control, processing, integration and amplification of respective rf AM/FM radio signals and rf cellular telephone communication signals being sent to the amplifier of the vehicle's audio system.

Referring also to FIG. 3, the rf signals of the radio and cellular phone are processed and converted from high frequency rf signals into audio signals and transmitted to control logic circuitry 111. The control logic circuitry 111 controls the intensity of the audio of both the radio and cellular telephone as a function of the other. Thereafter, each of the respective signals are combined at interface circuitry 113 and transmitted to the vehicular audio system amplifier and to the vehicle's speakers.

Although the present invention has been described with reference to the preferred embodiments, workers skilled in the art will recognize that changes may be made in form and detail without departing from the spirit and scope of the invention. Having identified the presently preferred best mode thereof, I claim:

1. An audio/mobile telephone system comprising:

an audio system for processing audio signals;

a mobile telephone connected to said audio system, said mobile telephone including a transceiver for processing transmitted and received mobile telephone communication signals;

a speaker assembly for audio production of said audio signals and for audio production of said received mobile telephone communication signals;

a power supply connected to said audio system and said mobile telephone for suppling power to said audio system and said mobile telephone;

an antennae means for transmitting and receiving mobile telephone communication signals; and a recorder means connected to said audio system and said mobile telephone for recording communications passing through said mobile telephone.

2. The audio/mobile telephone system of claim 1 wherein said mobile telephone is detachable and capable of use at a location distant from said audio system.

3. The audio/mobile telephone system of claim 1 wherein said audio signals include standard AM/FM radio signals.

4. The audio/mobile telephone system of claim 1 wherein said audio signals include memory stored on an audio compact disc (CD).

5. The audio/mobile telephone system of claim 1 wherein said audio system includes a standard tape recorder.

* * * * *

Disclaimer 6,058,298 — Ivano Stamegna, Irvine, Calif. VEHICULAR AUDIO SYSTEM INCORPORATING DETACHABLE CELLULAR TELEPHONE. Patent dated May 2, 2000. Disclaimer filed Aug. 2, 2002, by the assignee Vosi Technologies, Inc.

Hereby enters this disclaimer to claims 1, 2, and 4, of said patent.
*(Official Gazette, May 13, 2003)*

Disclaimer and Dedication

6,058,298—Ivano Stamegna, Irvine, Calif. VEHICULAR AUDIO SYSTEM INCORPORATING DETACHABLE CELLULAR TELEPHONE. Patent dated May 2, 2000. Disclaimer and dedication filed Aug. 2, 2002, by the assignee Vosi Technologies, Inc.

Hereby disclaims and dedicates to the public all claims of said patent.

*(Official Gazette, June 24, 2003)*